US012703493B2

(12) United States Patent
Joshi et al.

(10) Patent No.: US 12,703,493 B2
(45) Date of Patent: Aug. 11, 2026

(54) SYSTEMS AND METHODS FOR COOLING AN ELECTRIC AIRCRAFT

(71) Applicant: Toyota Motor Engineering & Manufacturing North America, Inc., Plano, TX (US)

(72) Inventors: Shailesh Joshi, Ann Arbor, MI (US); Danny Lohan, Northville, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 313 days.

(21) Appl. No.: 18/491,217

(22) Filed: Oct. 20, 2023

(65) Prior Publication Data

US 2025/0128821 A1 Apr. 24, 2025

(51) Int. Cl.
*B64D 27/24* (2024.01)
*B64C 29/00* (2006.01)
*B64D 27/34* (2024.01)
*B64D 33/08* (2006.01)

(52) U.S. Cl.
CPC ............. *B64D 27/24* (2013.01); *B64D 27/34* (2024.01); *B64D 33/08* (2013.01); *B64C 29/0025* (2013.01)

(58) Field of Classification Search
CPC .... B64C 29/0025; B64D 27/24; B64D 27/34; B64D 33/08
See application file for complete search history.

(56) References Cited

U.S. PATENT DOCUMENTS

| | | | | |
|---|---|---|---|---|
| 10,934,936 | B2 * | 3/2021 | Snyder | B64D 27/10 |
| 10,968,830 | B2 | 4/2021 | Snyder | |
| 2020/0336045 | A1 * | 10/2020 | Bodla | B64D 33/08 |
| 2021/0153394 | A1 * | 5/2021 | Mitic | B64C 11/00 |
| 2025/0044037 | A1 * | 2/2025 | Abuheiba | H01L 23/427 |
| 2025/0105703 | A1 * | 3/2025 | Nagai | H02K 5/161 |

FOREIGN PATENT DOCUMENTS

| | | |
|---|---|---|
| CN | 104244680 | 12/2014 |
| CN | 112421890 | 2/2021 |
| CN | 212627456 | 2/2021 |
| CN | 217005469 U * | 7/2022 |
| WO | 2021/241041 | 12/2021 |

* cited by examiner

*Primary Examiner* — Christopher M Koehler
*Assistant Examiner* — Ethan Nguyen Vo
(74) *Attorney, Agent, or Firm* — Dinsmore & Shohl LLP

(57) ABSTRACT

The present disclosure is directed to systems for cooling an electric aircraft. The system comprises an electronic device, a casing, and at least one PHP. The electronic device can generate heat. The electronic device can be housed within the casing. The casing comprises a casing inner wall and a casing outer wall wherein a first casing width is between the casing outer wall and the casing inner wall, and at least one PHP embedded in the first casing width. The casing may also comprise a casing inner base and a casing outer base wherein a second casing width is between the casing inner base and the casing outer base. The first casing width and second with may comprise a single fluidly connected channel with a connecting point, and a PHP may be embedded into the single fluidly connected channel. The system may be configured for use on an eVTOL.

16 Claims, 4 Drawing Sheets

SYSTEMS AND METHODS FOR COOLING AN ELECTRIC AIRCRAFT

BACKGROUND

Field

The present disclosure relates to systems and methods for cooling an electric aircraft.

Technical Background

Electric aircraft rely on motors to generate lift and/or thrust. Electric aircraft also use a variety of other electronic devices to control aircraft functions and complete various tasks. One type of electric aircraft can be an electric vertical takeoff and landing vehicle (eVTOL). These electronic devices can be packaged together within a casing. These electronic devices can generate significant heat which requires cooling in order to keep the electronics within their optimal operating temperature range. Conventional cooling systems can involve using the surface of the casing to spread heat, among other types of cooling devices. Conventional cooling systems can result in poor heat spreading capability around the surface of the package of electronics, which can result in lower cooling effectiveness and lower electronic functionality.

SUMMARY

Electronic devices generate heat during operation. As electronic devices are operated in more demanding situations, they will generate more and more heat. In order to operate effectively, electronic devices need to be maintained within an ideal operating temperature range. Thus, electronic devices need to be cooled. Oftentimes electronic devices are surrounding by protective casings which can help to prevent damage to the electronic devices but which can further trap the heat generated by the electronic devices. Casings may utilize cooling systems to try to cool off the electronic devices. A conventional cooling system can involve the use of the surface area of the casing itself to spread heat out. However, conventional cooling systems can result in poor heat spreading along the casing where the majority of the heat remains at the portion of the casing closest to the heat source and little heat spread to the portion of the casing furthest from the heat source. This results in an inefficient use of the casing surface area as the entirety of the surface area is not used for cooling. This effect is particularly relevant on electronic aircraft where a motor providing lift or thrust can generate a significant amount of heat because of the high power draw needed to power an electric aircraft. Therefore, there exists a need for a cooling system with increased cooling capacity in the same amount of space to keep up with the cooling demands of an electronic aircraft.

The present system can be a more efficient cooling system than conventional cooling systems by utilizing pulsating heat pipes (PHPs) in conjunction with a heat spreader casing. PHPs may also be referred to as oscillating heat pipes (OHPs). PHPs include a channel which has an evaporator section and a condenser section. A refrigerant is disposed within the channel. The refrigerant can travel between the evaporator section and condenser section, transforming between vapor phase and liquid phase. Such transformation can absorb and release heat, resulting in heat being absorbed from the electronic devices and released into an airflow at an end of the fin a distance from the casing. This can provide the advantage of higher heat transfer capability, spreading of high heat flux, ability to withstand g-forces experienced by an aircraft, performance insensitivity to orientation, and simplicity of structure.

In one embodiment, an electric motor assembly includes a motor housing with an end face, a motor within a motor housing, an electronics assembly disposed on the motor housing end face, where the electronics assembly includes a casing wherein the casing includes a casing inner wall and a casing outer wall wherein the space between the casing inner wall and the casing outer wall defines a first casing width, and at least one PHP embedded within the first casing width.

In another embodiment, an electric motor assembly includes a motor housing with an end face, a motor within a motor housing, an electronics assembly disposed on the motor housing end face, where the electronics assembly includes a casing wherein the casing includes a casing inner wall, a casing outer wall, wherein the space between the casing inner wall and casing outer wall defines a first casing width, a casing inner base, a casing outer base, wherein the space between the casing outer base and the casing inner base defines a second casing width, wherein the first casing width and second casing width include a single channel with at least one connecting point, and at least one PHP embedded within the single channel.

In yet another embodiment, an electric vertical takeoff and landing (eVTOL) vehicle includes an electric motor assembly includes a motor housing with an end face, a motor within a motor housing, an electronics assembly disposed on the motor housing end face, where the electronics assembly includes a casing wherein the casing includes a casing inner wall and a casing outer wall wherein the space between the casing inner wall and the casing outer wall defines a first casing width, and at least one PHP embedded within the first casing width.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of the present disclosure may be better understood when read in conjunction with the following drawings in which.

Figure 1:
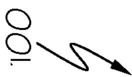
FIG. 1 schematically depicts a front section view of a casing with a first casing width and a second casing width and a connecting point including a single fluidly connected channel with a PHP embedded within the single fluidly connected channel.
Figure 1:
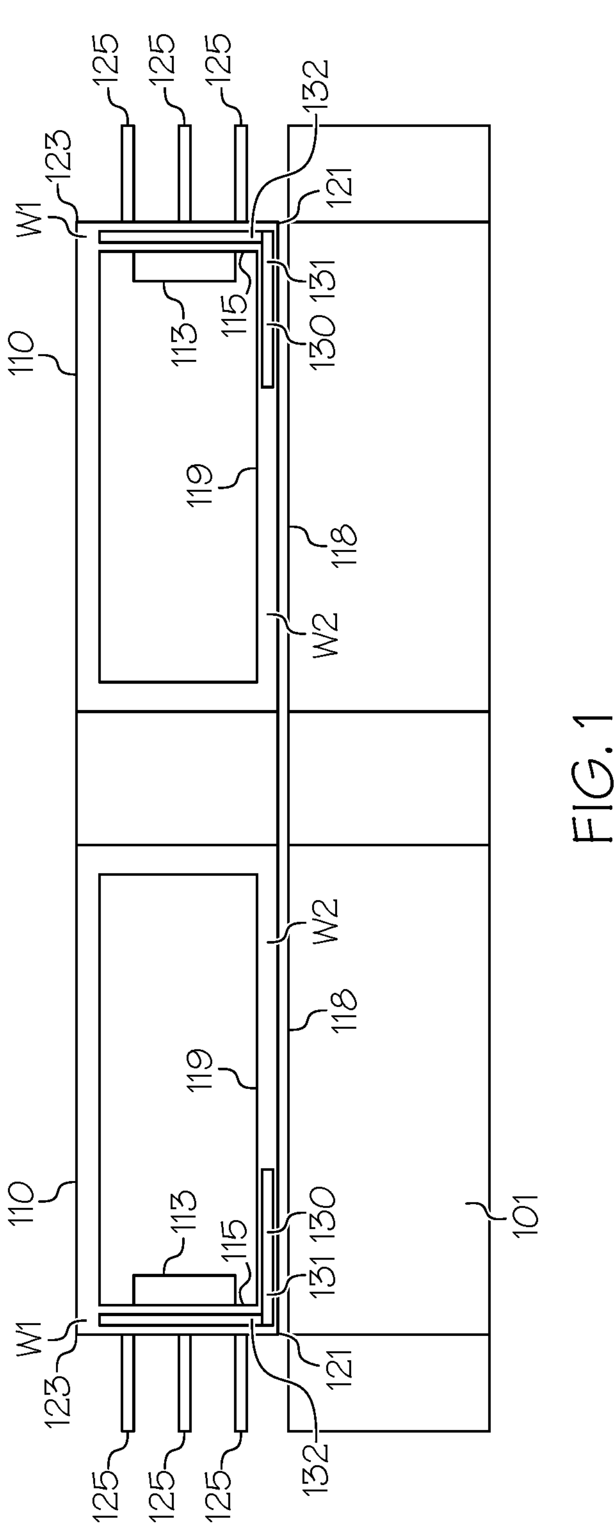

Reference will now be made in greater detail to various embodiments of the present disclosure, some embodiments of which are illustrated in the accompanying drawings.

Whenever possible, the same reference numerals will be used throughout the drawings to refer to the same or similar parts.

DETAILED DESCRIPTION

Embodiments of the present disclosure utilize PHP in an electronics casing to providing cooling to components of an electric machine, such as an eVTOL. More particularly, the system includes one or more PHPs within the width of a casing which houses electronic devices so as to increase the heat spreading efficiency of the casing. The portion of the PHP closest to the heat source serves as the evaporator. The portion of the PHP furthest from the heat source and placed within the air flow of the electronic aircraft serves as the condensing portion. This arrangement allows for more uniform heat spreading throughout the casing, and more cooling capacity to remove heat from the electronic device.

The PHP is a complete loop such that the internal contents can be passed from the evaporator section to the condenser section, back to the evaporator section, and so on. In some embodiments, the PHP can be arranged in a winding manner such that a single PHP can include multiple condenser sections and multiple evaporator sections all within a single PHP and in some embodiments all embedded within the single interior channel.

In some embodiments, the casing condenser section can have one or more cooling fins arranged around the perimeter of the casing.

The term "evaporator" refers to the portion of the PUP where liquid is converted from a liquid to a gas, absorbing heat. The term "condenser" refers to the portion of the PUP where gas is converted from a gas to a liquid, releasing heat.

Conventional cooling systems can limit heat spread and concentrate heat at the portion of the casing closest to the heat source. This does not efficiently use the full area of the casing as heat is not dissipated across the entire casing, and also removes less heat from the heat source the casing is designed to cool compared to conventional cooling systems. Embodiments of the present disclosure can more effectively transfer heat throughout the entire casing to more efficiently use the total area of the casing and to increase the spread of heat throughout the entire casing compared to conventional cooling systems. Embodiment also disperse more heat away from the heat source compared to conventional cooling systems.

Referring now to FIG. 1 a front section view of an embodiment of the system 100 is shown. The system 100 includes a casing 110. The casing 110 includes a casing wall 123. The casing wall 123 includes a casing inner wall 115 and a casing outer wall 112. The casing inner wall 115 and the casing outer wall 112 define a first casing width W1. The casing 110 further includes a casing base 124. The casing base 124 includes a casing inner base 119 and a casing outer base 118. The casing inner base 119 and the casing outer base 118 define a second casing width W2. The first casing width W1 and the second casing width W2 includes a single fluidly connected channel 122. The single fluidly connected channel 122 includes a connecting point 121. The connecting point 121 may be the corner of a casing 110. The PHP 130 may be embedded within the single fluidly connected channel 122. The PHP condenser section 132 can be embedded within the first casing width W1. The PHP evaporator section 131 can be embedded within the second casing width W2.

This embodiment may allow for the electronic devices 113 to be placed on the casing base 124 so that they are in proximity to the PHP evaporator section 131. The casing wall 123 can be placed in the airflow of the propeller 102 so that the airflow may be in proximity to the PHP condenser section 132. A plurality of fins 125 can be attached to the casing wall 123.

In some embodiments, the PHP 130 includes a single circuit for the refrigerant inside of the single fluidly connected channel 122 such that the portion of the PHP 130 embedded within the second casing width W2 can function as a PHP evaporator section 131, and the portion of the PHP embedded within the first casing width W1 can function as the PHP condenser section 132. In other embodiments, the PHP 130 includes a plurality of circuits for the refrigerant inside of the casing width such that the PHP 130 includes a single closed loop wherein there are multiple PHP evaporator sections 131 embedded within the second casing width W2 and there are multiple PHP condenser sections 132 embedded with the first casing width W1 that comprise a single PHP 130.

Figure 2:
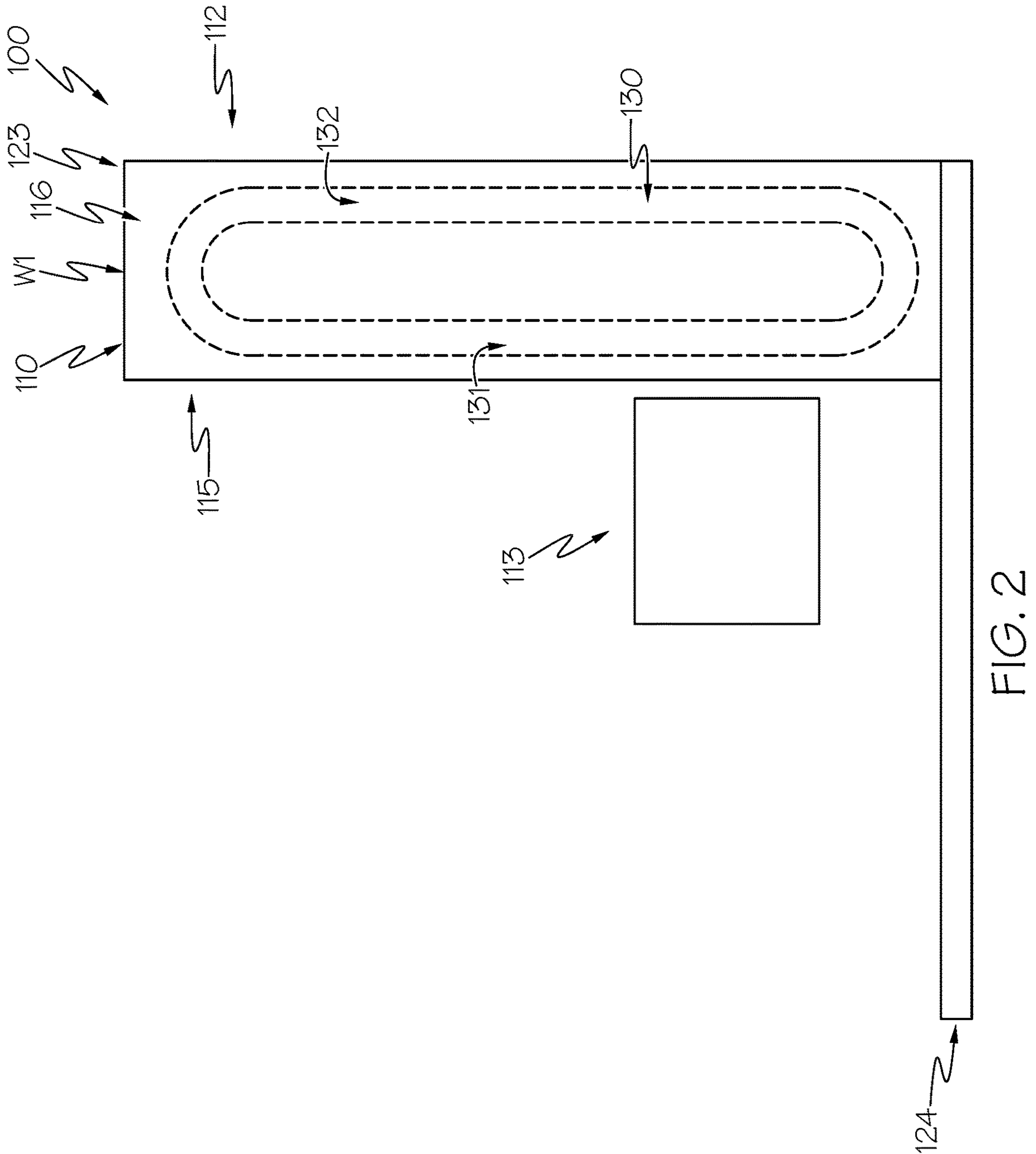
FIG. 2 schematically depicts a front section view of a casing with a first casing width and a PHP embedded within the first casing width.

Referring now to FIG. 2, a front view of an embodiment of the system 100 is shown. The system 100 includes a casing 110 with a casing inner wall 115 and a casing outer wall 112. The casing inner wall 115 and the casing outer wall 112 define a first casing width W1. A PHP 130 can be embedded inside of the first casing width W1. The PHP 130 includes a channel wherein alternating vapor plugs and liquid slugs of a refrigerant are placed within the channel. As a non-limiting example, R404A may be used as the refrigerant. In some embodiments, the PHP 130 includes a single circuit for the refrigerant inside of the first casing width W1 such that the portion of the PHP 130 closest to the heat source can function as a PHP evaporator section 131, and the portion of the PHP furthest from the heat source can function as the PHP condenser section 132. In another embodiment, the PHP 130 includes a plurality of circuits for the refrigerant inside of the casing width W1 such that the PHP 130 includes a single closed loop wherein there are multiple PHP evaporator sections 131 closest to the heat source and there are multiple PHP condenser sections 132 furthest from the heat source in a single PHP 130. The electronic device 113 can be the heat source of the system 100.

Figure 3:
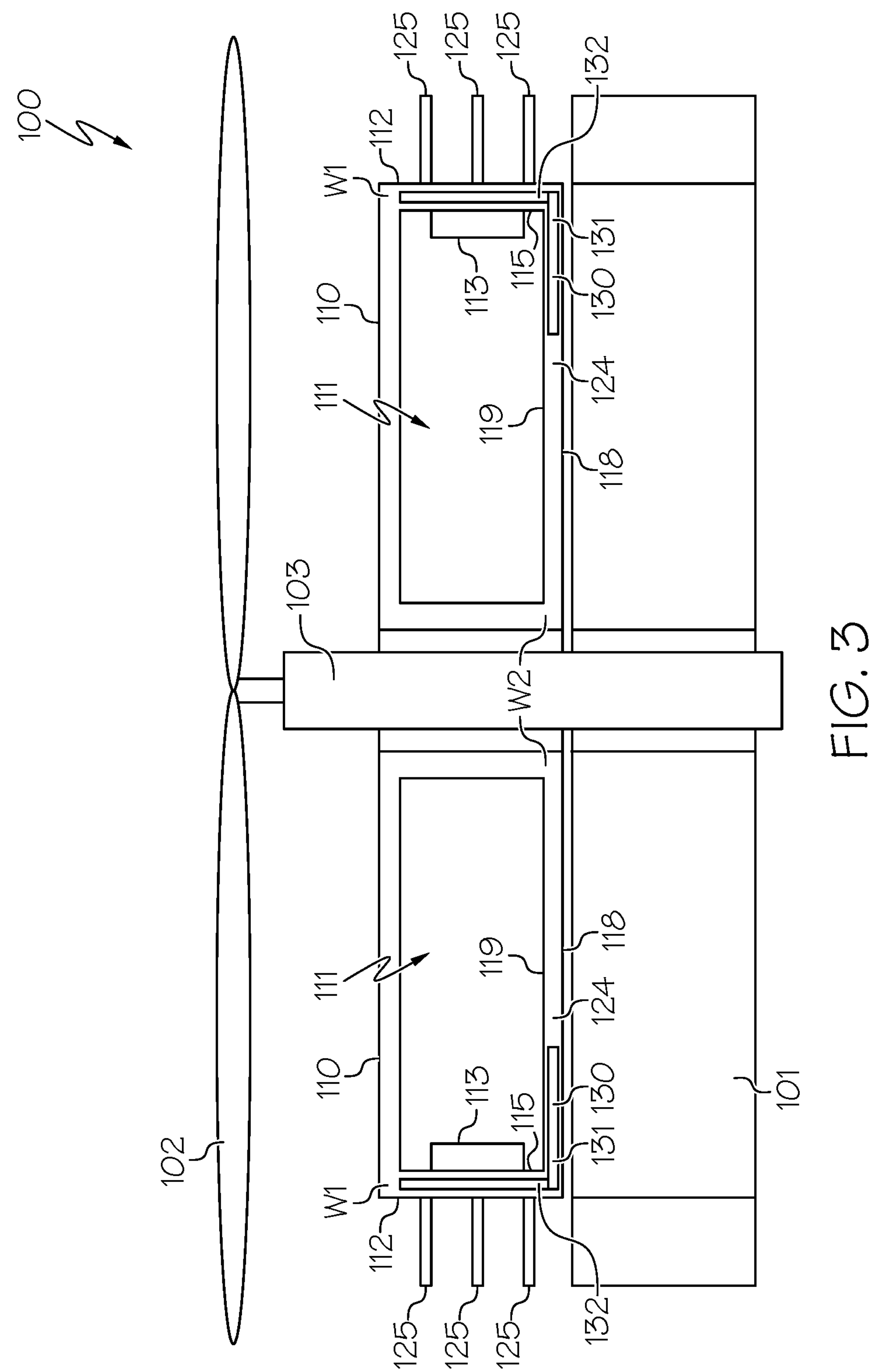
FIG. 3 schematically depicts a front section view of a motor, a casing, a plurality of fins, and a propeller assembly, according to one or more embodiments shown and described herein.

Referring now to FIG. 3 an example system 100 is shown, such as a system for an eVTOL. The system 100 includes the casing 110, a motor 101, one or more electronic devices 113, a propeller 102, and a propeller shaft 103. The electronic device 113 is disposed within the casing interior cavity 111. A plurality of fins 125 extend from outside of the casing 110. The propeller shaft 103 is coupled to the motor 101 and the propeller 102. Casing 110 may have a pass through 117 to allow the propeller shaft 103 to pass from motor 101 to propeller 102. Propeller 102 may provide lift, thrust, or a combination of lift and thrust. Any number of fins 125 may be provided.

The electronic devices 113 in the casing interior cavity 111 can be one or more different electronic devices 113. The electronic devices 113 can be included in an inverter circuit including power electronic devices, gate drive electronic devices and/or the like. The electronic devices 113 may include a capacitor, an insulated-gate bipolar transistor, a power MOSFET, or any other electronic devices. The electronic devices 113 can be the heat source of the system 100, wherein the electronics generate heat during operation.

The casing 110 surrounding the electronic devices 113 can be any number of shapes, including but not limited to a cylinder, a toroid, or a rectangular prism. The casing 110 can be made of any number of materials, including but not limited to aluminum. The casing 110 includes at least one wall and an interior cavity (i.e., an enclosure). The casing 110 has a casing wall 123 and a casing base 124. In some embodiments, there may be a plurality of casings 110 arranged together wherein each casing 110 has at least one fin 125 attached to it.

The fins 125 can be mounted to the casing 110. For example, the fins 125 can be mounted to the casing 110 by various methods, including but not limited to soldering, brazing, and welding. In some embodiments, the fins 125 and the casing 110 may be made from a single piece of material (e.g., by casting or machining). The fins 125 can be any number of shapes, including but not limited to a cylinder or a rectangular prism.

Figure 4:
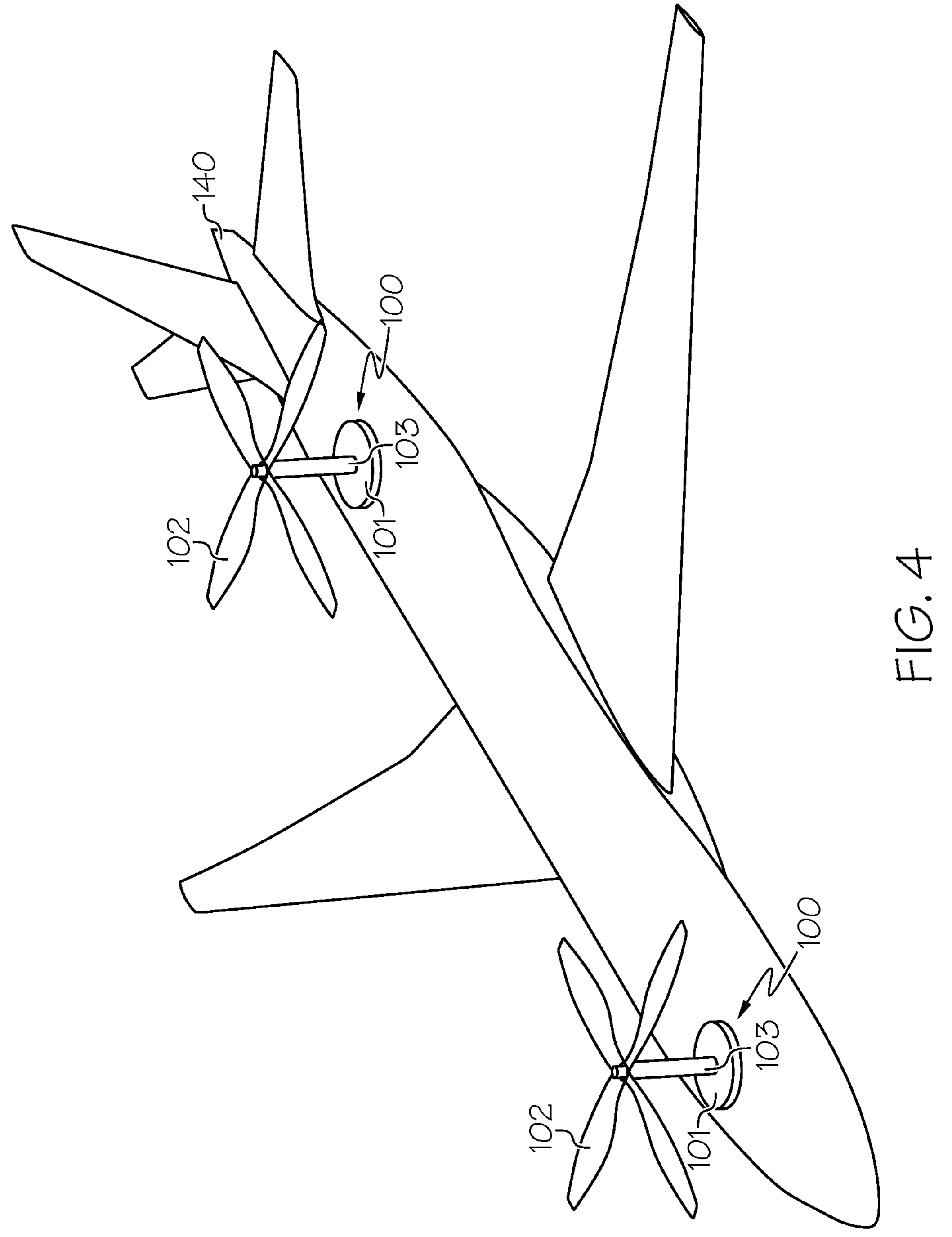
FIG. 4 schematically depicts the system configured for use on an eVTOL.

Referring now to FIG. 4, the system 100 is shown on an eVTOL 140. A plurality of motors 101 coupled by a plurality of propeller shafts 103 to a plurality of propellers 102 may be used. The eVTOL 140 may use the lift from the plurality of propellers 102 to vertically takeoff and land. The plurality of propellers 102 may also provide thrust such that the eVTOL 140 can move forward. The airflow from the propeller 102 may also provide airflow to the fins 125 (not shown), the casing wall 123 (not shown), or both the fins 125 and the casing wall 123. The airflow may allow for PHP condenser section 132 to condense the refrigerant inside of the PHP 130, which can cool the electronic devices 113.

There exists a need for a cooling system for an electronic aircraft with enhanced cooling capability which can operate in the same amount of space as conventional cooling systems. The cooling system may embed a PHP within the width of a casing. The PHP may be embedded both within the casing floor and the casing wall to allow for the use of more surface area of the casing to increase the cooling capacity of the system. The electronic devices may be placed in the casing where they generate heat. The electronic devices may be mounted on the casing floor such that they are in contact with the evaporator section of the PHP. The airflow from the propellers of the electric aircraft can pass over the condenser section of the PHP. This arrangement can use a large portion of the casing's surface area (both the base and the wall) to maximize the cooling effect of the system.

It may be noted that one or more of the following claims utilize the terms "where," "wherein," or "in which" as transitional phrases. For the purposes of defining the present technology, it may be noted that these terms are introduced in the claims as an open-ended transitional phrase that are used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it may be noted that the various details described in this disclosure should not be taken to imply that these details relate to elements that are essential devices of the various embodiments described in this disclosure, even in casings where a particular element may be illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

The invention claimed is:

1. An electric motor assembly comprising:

a motor housing having a terminal surface;

a motor within the motor housing;

an electronics assembly positioned on the terminal surface that forms an end face of the motor housing, the electronics assembly comprising:

a casing comprising a casing interior cavity and a casing outer wall and a casing inner wall where a first casing width is between the casing inner wall and the casing outer wall;

at least one electronic device within the casing interior cavity; and one or more pulsating heat pipes embedded within the first casing width.

2. The electric motor assembly of claim 1, wherein a portion of the casing interior cavity in contact with the at least one electronic device is an evaporator and the portion of the casing interior cavity not in contact with the at least one electronic device is a condenser.

3. The electric motor assembly of claim 1, wherein the at least one electronic device contacts the casing inner wall.

4. The electric motor assembly of claim 1, further comprising:

a propeller shaft coupled to the motor and passing through an opening of the casing; and a propeller coupled to the propeller shaft, wherein rotation of the propeller causes air to pass by the casing outer wall.

5. The electric motor assembly of claim 1, wherein the pulsating heat pipe has multiple condenser sections and multiple evaporator sections.

6. An electric motor assembly comprising:

a motor housing having a terminal surface;

a motor within the motor housing;

an electronics assembly positioned on the terminal surface that forms an end face of the motor housing, the electronics assembly comprising:

a casing comprising a casing interior cavity and a casing outer wall and a casing inner wall where a first casing width is between the casing inner wall and the casing outer wall, a casing outer base and a casing inner base where a second casing width is between the casing outer base and the casing inner base, and where the first casing width and the second casing width comprise a single fluidly connected channel comprising at least one connecting point;

at least one electronic device within the casing interior cavity; and one or more pulsating heat pipes embedded within the single fluidly connected channel.

7. The electric motor assembly of claim 6, wherein the first casing width is an evaporator section of the pulsating heat pipe and the second casing width is a condenser section of the pulsating heat pipe.

8. The electric motor assembly of claim 6, wherein the plurality of electronic devices contact the casing inner wall.

9. The electric motor assembly of claim 6, further comprising:

a propeller shaft coupled to the motor and passing through an opening of the casing; and a propeller coupled to the propeller shaft, wherein rotation of the propeller causes air to pass by the casing outer wall.

10. The electric motor assembly of claim 6, wherein the pulsating heat pipe has multiple condenser sections and multiple evaporator sections.

11. An electric vertical take-off and landing vehicle (eVTOL) comprising:

an electric motor assembly comprising:

a motor housing having a terminal surface;

a motor within the motor housing;

an electronics assembly positioned on the terminal surface that forms an end face of the motor housing, the electronics assembly comprising:

a casing comprising a casing interior cavity, a casing outer wall and a casing inner wall where a first casing width is between the casing inner wall and the casing outer wall, and wherein the casing defines an enclosure;

at least one electronic device within the enclosure; and one or more pulsating heat pipes embedded within the first casing width.

12. The eVTOL of claim 11, further comprising:

a casing outer base and a casing inner base where a second casing width is between the casing outer base and the casing inner base, and where the first casing width and the second casing width comprise a single fluidly connected channel comprising at least one connecting point; and the one or more pulsating heat pipes is embedded within the single fluidly connected channel.

13. The eVTOL claim 11, wherein a portion of the casing interior cavity in contact with the at least one electronic device is an evaporator and the portion of the casing interior cavity not in contact with the at least one electronic device is a condenser.

14. The eVTOL claim 11, wherein the plurality of electronic devices contact the casing inner wall.

15. The eVTOL of claim 11, further comprising:

a propeller shaft coupled to the motor and passing through an opening of the casing; and a propeller coupled to the propeller shaft, wherein rotation of the propeller causes air to pass by the casing outer wall.

16. The eVTOL of claim 11, wherein the pulsating heat pipe has multiple condenser sections and multiple evaporator sections.

* * * * *